Feb. 28, 1928.

E. H. WEBB 1,660,775

UNIVERSAL TORQUE TRANSMITTING DEVICE

Filed Jan. 18, 1924

INVENTOR
Ernest H. Webb.
BY
Cooper, Kerr & Dunham
ATTORNEYS

Feb. 28, 1928.

E. H. WEBB 1,660,775

UNIVERSAL TORQUE TRANSMITTING DEVICE

Filed Jan. 18, 1924　　2 Sheets-Sheet 2

INVENTOR
Ernest H. Webb
BY
Cooper, Kerr & Dunham
ATTORNEYS

Patented Feb. 28, 1928.

1,660,775

UNITED STATES PATENT OFFICE.

ERNEST H. WEBB, OF NEW BRUNSWICK, NEW JERSEY.

UNIVERSAL TORQUE-TRANSMITTING DEVICE.

Application filed January 18, 1924. Serial No. 687,143.

This invention relates to torque-transmitting couplings. More specifically it relates to universal torque-transmitting couplings; i. e., to couplings adapted to transmit torque from a driving member to a driven member and to permit of relative angular movement of the axes of rotation of said members while the driving is being effected.

Some of the objects of the invention are to provide couplings of the above described type which are efficient in operation, comparatively simple in construction and easy to assemble and disassemble, and in which the wear is greatly reduced so that long useful life is attained. Other objects and advantages will appear as the invention is hereinafter disclosed.

Referring to the drawings which illustrate what I now consider a preferred form of the invention:

Figure 1:
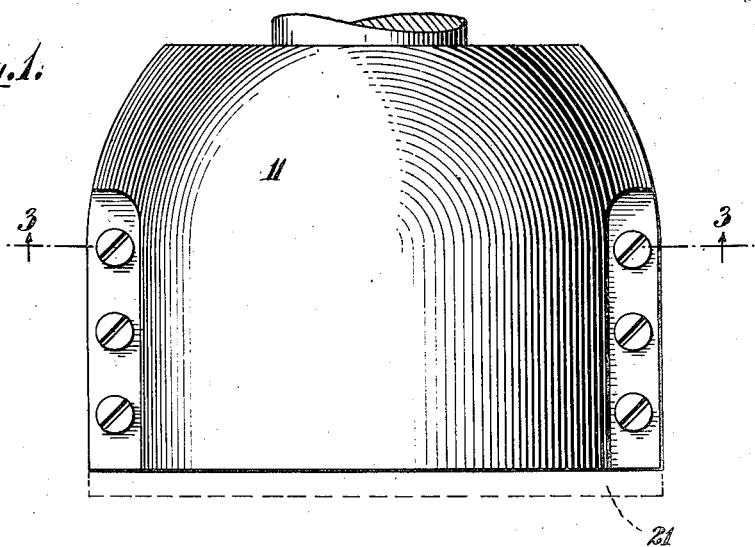
Fig. 1 is a plan view of a torque-transmitting coupling or universal joint.
Figure 3:
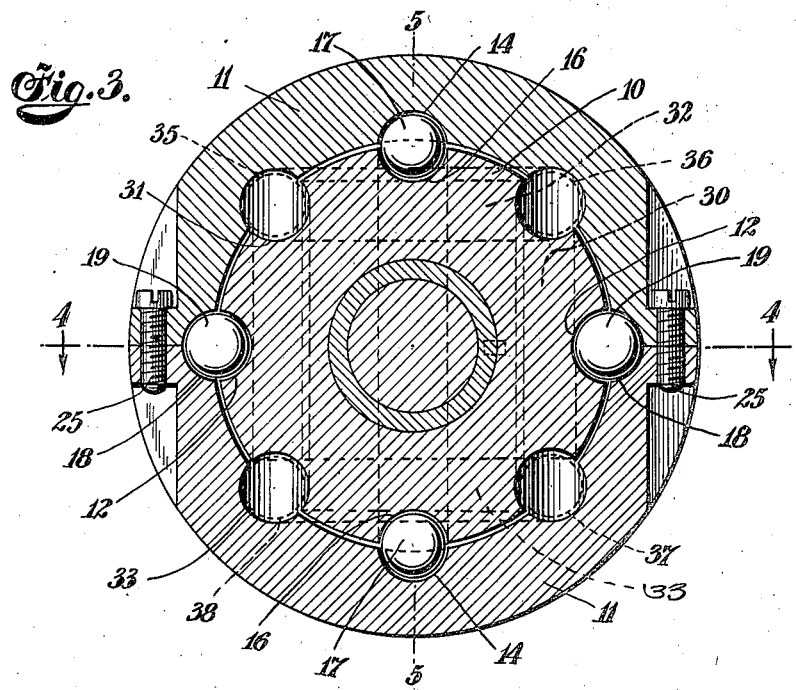

Fig. 3 is a sectional elevation taken on the line 3—3 of Fig. 1.

Figure 4:
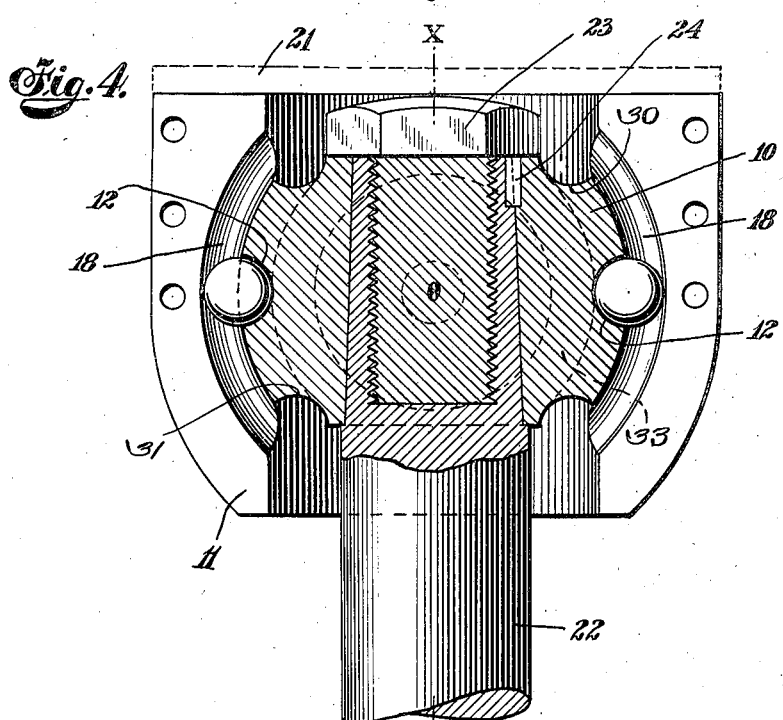

Fig. 4 is a horizontal section taken on the line 4—4 of Fig. 3.

The coupling is shown as comprising an inner member 10 and an outer member 11 which at least partially surrounds the inner member when the parts are assembled. For the purpose of the present disclosure it will be assumed that the outer member 11 is the driving member and is to drive the inner or driven member 10, it being understood that either of said members 10 and 11 may be employed as the driving member and the other as the driven member.

The inner member 10 is provided with a pair of diametrically opposed substantially hemispherical seats or sockets 12, 12, the centers of which lie upon the axis 4—4 which passes through the center 0 of the couplings and lies in a plane perpendicular to the axis of rotation of the members 10 and 11 when these axes are in alignment. The outer member 11 is provided with a pair of diametrically opposed substantially hemispherical seats or sockets 14, 14, the centers of which lie upon the axis 5—5 which passes through the center of the coupling, is perpendicular to the axis 4—4 and lies in the above described plane. The inner member 10 is also provided with annular raceways 16, 16, which are substantially semicircular in cross-section and in which the balls 17, 17, seated in the sockets 14, 14, are adapted to roll, upon relative rotation of the members 10 and 11 about the axis 4—4. The outer member 11 is also provided with annular raceways 18, 18, which are substantially semicircular in cross-section and in which the balls 19, 19, seated in the sockets 12, 12, are adapted to roll upon relative rotation of the members 10 and 11 about the axis 5—5. It will be noted that the centers of the balls 17, 17, are substantially fixed with respect to the outer member 11, the center of each of these two balls being at all times (no matter what the relative positions of the inner and outer members 10 and 11 may be) the same as the center of curvature of a corresponding one of the seats or sockets 14, 14. Likewise the centers of the balls 19, 19, are substantially fixed with respect to the inner member 10, the center of each of these two balls being at all times (no matter what the relative positions of the inner and outer members 10 and 11 may be) the same as the center of curvature of a corresponding one of the seats or sockets 12, 12. Or, in other words, the axis 5—5 through the centers of the two balls 17, 17, is fixed with respect to the outer member 11, and the axis 4—4 through the centers of the two balls 19, 19, is fixed with respect to the inner member 10. Each of the raceways 18, 18 is a continuation of the other and of such configuration as would be generated by rotating either of the semicircles (shown at 18, 18, in Fig. 3) about the axis 5—5. Each of the raceways 16, 16, is a continuation of the other and of such configuration as would be generated by rotating either of the semicircles (shown at 16, 16, in Fig. 3) about the axis 4—4.

By virtue of the construction above described, it will be seen that the balls 17, 17, and 19, 19, act as keys between the members 10, 11, so that rotation of the latter or outer member about the axis OX will drive or cause rotation of the inner member 10 about the axis OY. This drive connection or coupling is effective even though the axes OX and OY are at any one of a number of different angles with respect to each other, in view of the fact that the members 10 and 11 are movable with respect to each other about either or both of the axes 4—4 and 5—5. The driving member 11 may be bolted or otherwise secured or connected to a flange 21 of an engine or motor to be driven thereby and the driven member 10 may be secured to a shaft 22 to transmit power. The shaft 22 is shown provided with a tapered end which fits into a tapered bore in the member 10 and which is provided with a capscrew 23 whereby the shaft and member 10 may be operatively connected. If necessary or desirable a key pin 24 may be provided between the shaft 22 and the member 10 to insure that there shall be no rotation of these two members with respect to each other. It will be further noted that that end of the member 11 through which the shaft 22 projects is externally shaped as a portion of a sphere having its center at 0—the center of the coupling. By virtue of this construction, the shaft 22 may be provided with a grease-retaining cup or shield (not shown) having an inner spherical surface centered at 0 and adapted to fit, more or less closely, the outer spherical surface of the member 11. For convenience in manufacture, assembly, inspection and repair, the outer member 11 is shown made in two halves detachably joined by screws 25 which pass through holes in one section and into tapped holes in the other.

In the form of invention thus far described, there are four torque-transmitting balls which serve as keys. If it is desired to transmit greater torque or to lessen the wear of parts, a greater number of torque-transmitting balls may be employed. For example, eight balls may be employed by adopting the structure which I shall now proceed to describe.

The inner member 10 is provided with two additional race-ways 30, 31. In the particular arrangement shown, the race-way 30 is of such configuration as would be generated as follows. Fig. 3 shows the relative position of the members 10 and 11 when their axes OX and OY are in alignment. The center of the semicircle 30 (Fig. 3) lies on the circle passing through the centers of the balls 17, 19. In the present embodiment, this center lies also upon a line which passes through the center of the coupling and makes an angle of 45° with the axis 4—4. If this semicircle is rotated about the axis 4—4, the race-way 30 will be generated. The raceway 31 is symmetrically located and similarly defined on the opposite side of the member 10.

The outer member 11 is provided with two additional race-ways 32, 33. The race-way 32 may be defined as generated by rotating the semicircle 32 (whose center—Fig. 3—is the same as that of the above mentioned semicircle 30) about the axis 5—5. Similarly the race-way 33 would be generated by rotating the semicircle 33 about the axis 5—5. It will be appreciated that the raceways are broken away in parts in the particular form of coupling illustrated for the reason that the limit of angular movement of axes OX and OY with respect to each other, is determined by engagement of the shaft 22 with the outer member 11.

Figure 2:
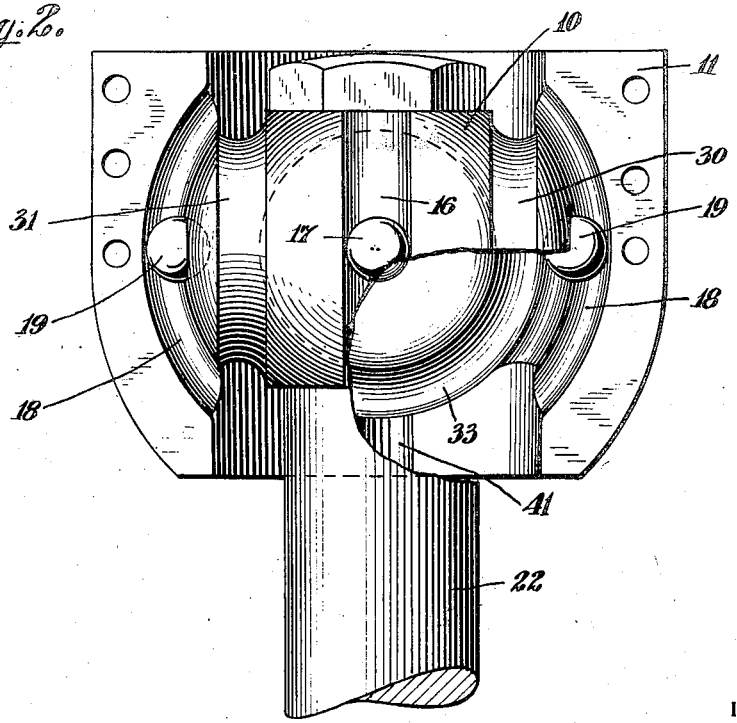
Fig. 2 is a plan view of the universal joint shown in Fig. 1 but with the upper half of the outer member removed and with a part of the inner member broken away, Fig. 2 showing the whole device rotated 180° about a vertical axis with respect to the position shown in Fig. 1.

It will now be understood that, when the shafts OX and OY are in alignment, the race-ways 30, 31, 32, 33, intersect each other at four points on the circle passing through the centers of the balls 17, 17, 19, 19, shown in Fig. 3. Four torque-transmitting balls 35, 36, 37 and 38 (shown in dotted lines in Fig. 3) may be located at the intersections of the race-ways 30, 31, 32 and 33, the ball 35 being at the intersection of the race-ways 31—32, the ball 36 being at the intersection of the race-ways 30—32, the ball 37 being at the intersection of the race-ways 30—33 and the ball 38 being at the intersection of the race-ways 31—33. When the members 10 and 11 move with respect to each other about the axis 4—4, the balls 35, 38 roll in the race-way 31, and the balls 36, 37, roll in the race-way 30; when the members 10 and 11 move with respect to each other about the axis 5—5, the balls 35, 36 roll in the race-way 32, and the balls 37, 38, roll in the race-way 33; and when the members 10 and 11 move with respect to each other about both axes 4—4 and 5—5, each of the balls 35, 36, 37 and 38 rolls in both of the race-ways in which it is mounted. By virtue of this construction, a universal joint having eight torque-transmitting, key-forming, balls is provided. The torque is transmitted smoothly and the wear is minimized by virtue of the fact that each of the balls may revolve in any direction about its center. In order that the coupling illustrated may be assembled, each of the sections which together constitute the outer member 11 is provided with a trough 41 (one of which is shown in Fig. 2) which is semicircular in cross-section and leads from one of the ends of the member 10 into a corresponding one of the race-ways 32 and 33. The coupling may be assembled as follows.

A ball 17 is placed in the socket or seat 14 in the lower section of the member 11 and the balls 19, 19, are placed in the sockets 12, 12 of the member 10, the latter being then placed in the lower section of the member 11. The other of the balls 17 is now placed in the seat or socket 14 of the other section of the member 11, and the member 10, with the first mentioned section of the member 11 held in position thereon, is placed in the second mentioned section of the outer member. The screws 25, 25, may now be driven home to secure the sections of the member 11 together. The ball 37 may now be inserted into the intersection of the race-ways 30—33 by rotating the inner member about the axis 5—5 in a clockwise direction (Fig. 3) to a sufficient extent, inserting the ball through the trough 41 into the raceway 33, and thence also into the race-way 30. The balls 35, 36 and 38 may be inserted into their positions by performing similar operations. The inner member 10 can then be rotated about the axis 5—5 in an anti-clockwise direction, returning member 10 to such position that axis OX will be substantially in alignment with axis OY. The shaft 22 may now be inserted into the opening in the inner member 10, the key 24 inserted and the cap screw 23 screwed home.

The assembly, operation, and disassembly of the form of invention illustrated will now be understood by those skilled in the art in view of the foregoing description.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is:

1. A universal torque-transmitting coupling comprising in combination, an inner member and an outer member, balls mounted between said members, two of said balls having their centers lying on an axis about which said members are relatively movable and two others of said balls having their centers lying on axis at an angle to said first-named axis and about which second-named axis said members are relatively movable, one of said members having seats for the balls whose centers lie upon the first-mentioned axis and having race-ways for the balls whose centers lie upon the second-mentioned axis, the other of said members having seats for the balls whose centers lie upon the second-mentioned axis and having race-ways for the balls whose centers lie upon the first-mentioned axis and both of said members having additional race-ways of which the race-ways in one member intersect those of the other member, and in which balls are mounted at the intersections of the race-ways.

2. A universal torque-transmitting coupling comprising in combination, an inner member and an outer member, balls mounted between said members, two of said balls having their centers lying on an axis about which said members are relatively movable and two others of said balls having their centers lying on axis at an angle to said first-named axis and about which second-named axis said members are relatively movable, one of said members having substantially hemispherical seats for the balls whose centers lie upon the first-mentioned axis and having race-ways for the balls whose centers lie upon the second mentioned axis, the other of said members having substantially hemispherical seats for the balls whose centers lie upon the second-mentioned axis and having race-ways for the balls whose centers lie upon the first-mentioned axis, and both of said members having additional race-ways of which the race-ways in one member intersect those of the other member, and balls mounted at the intersection of the race-ways.

3. A universal torque-transmitting coupling comprising in combination, a driving member and a driven member one of which at least partially surrounds the other, the inner surface of the outer member being provided with a plurality of race-ways and the outer surface of the inner member being provided with a plurality of race-ways which intersect said first-mentioned race-ways on a plane at right angles to the axis of rotation of said members when the axes of said members are in alignment, said outer member having troughs intersecting said first-mentioned race-ways, and balls-mounted in said race-ways at all of the intersections of the race-ways.

4. A universal torque-transmitting coupling comprising in combination, a driving member and a driven member, one of which at least partially surrounds the other, the inner surface of the outer member being provided with a plurality of race-ways and the outer surface of the inner member being provided with a plurality of race-ways which intersect said first mentioned race-ways, a plurality of balls associated with both of said members, and means comprising a trough intersecting one of said first mentioned race-ways and intersecting one of said last mentioned race-ways when the axes of said driving member and of said driven member are at a predetermined angle whereby a ball may be introduced to the intersection of said last mentioned race-ways through said means.

5. A universal torque-transmitting coupling comprising in combination, a driving member and a driven member, one of which at least partially surrounds the other, the inner surface of the outer member being provided with a plurality of race-ways and the outer surface of the inner member being provided with a plurality of race-ways which intersect said first mentioned race-ways, a plurality of balls adapted to be disposed at the intersections at said race-ways, and means normally intersecting the race-ways of one of said members and adapted to intersect the race-ways of the other of said members when the axes of said members are at predetermined angles whereby said balls may be introduced to the intersections of said first mentioned race-ways with said second mentioned race-ways.

In testimony whereof I hereto affix my signature.

ERNEST H. WEBB.